United States Patent [19]

Shimizu et al.

[11] Patent Number: 4,517,257

[45] Date of Patent: May 14, 1985

[54] RECORDING MEDIA COMPRISING VERTICAL MAGNETIZATION LAYERS ESSENTIALLY CONSISTING OF QUATERNARY Co—Ni—Zn—P ALLOYS

[75] Inventors: Shigeo Shimizu, Yokohama; Toshio Kato, Yamato, both of Japan

[73] Assignee: Victor Company of Japan, Ltd., Japan

[21] Appl. No.: 531,681

[22] Filed: Sep. 13, 1983

[30] Foreign Application Priority Data

Sep. 14, 1982 [JP] Japan .................................. 57-158926

[51] Int. Cl.$^3$ ............................................. G11B 5/64
[52] U.S. Cl. .................................... 428/694; 427/131; 427/132; 428/900; 360/134; 360/135; 360/136
[58] Field of Search ................ 428/900, 694; 427/131, 427/132; 360/134–136

[56] References Cited

U.S. PATENT DOCUMENTS

| | | | |
|---|---|---|---|
| 3,993,824 | 11/1976 | Shirahata | 428/336 |
| 4,153,920 | 5/1979 | Shirahata | 428/900 |
| 4,309,471 | 1/1982 | Suzuki | 428/337 |

Primary Examiner—Ellis P. Robinson
Attorney, Agent, or Firm—Lowe, King, Price & Becker

[57] ABSTRACT

Magnetic recording media suitable for use in vertical magnetization recording systems are described. The media comprise a magnetic layer on at least one side of a substrate. The magnetic layer is made of a specific type of quaternary alloy. The alloy essentially consists of from 3 to 42 wt % of Co, from 54 to 89 wt % of Ni, from 4 to 8 wt % of P, and from 0.1 to 3.2 wt % of Zn provided that $(7.2\ X_P+12.8)$ wt % $\leq X_{Ni} \leq (7.2\ X_P+43.2)$ wt % in which $X_P$ represents a content of P and $X_{Ni}$ represents a content of Ni, both expressed by wt %.

4 Claims, 4 Drawing Figures

RECORDING MEDIA COMPRISING VERTICAL MAGNETIZATION LAYERS ESSENTIALLY CONSISTING OF QUATERNARY CO—NI—ZN—P ALLOYS

BACKGROUND OF THE INVENTION

1. Field of the Invention

This invention relates to recording media and more particularly, to high density recording and reproducing media comprising a specific type of vertical magnetization film.

2. Description of the Prior Art

Ordinary magnetic recording media, such as magnetic tapes, magnetic sheets, magnetic discs, magnetic cards and the like, employed in audio or video recording and reproducing systems and as data files for computers are made of substrates and magnetic layers formed on the substrate. These magnetic recording media are magnetized in directions parallel to the medium surface. However, the magnetic recording in the horizontal directions involves the increasing action of self-demagnetization of the magnetic recording medium itself when the medium is used for high density recording, resulting in considerable lowering of the reproduction output level.

In order to solve the self-demagnetization problem involved in the high density recording, attention has been drawn to recording media comprising vertical magnetization films in which the self-demagnetization action becomes smaller in high density recording operations. The term "vertical magnetization film" used herein is intended to mean a magnetic film which has an axis of easy magnetization perpendicular to the film surface and whose magnetic moment is perpendicular to the film surface, i.e. the constant of magnetic anisotropy has a positive value. When an intrinsic vertical anisotropy constant is taken as $K\perp$ and a diamagnetic field is taken as $2\pi Ms^2$ in which Ms is a saturation magnetization, the magnetic anisotropy constant Ku can be expressed as follows: $Ku = K\perp - 2\pi Ms^2$. In order that the magnetic layer is a vertical magnetization film, the following inequality must be satisfied: $Ku > 0$ or $K\perp > 2\pi Ms^2$. A higher intrinsic anisotropy constant of film than the diamagnetic field will produce more preferable results as magnetic recording media.

For instance, a thin film of cobalt itself containing no impurities has a saturation magnetization of about 1400 emu/cc and its magnetic anisotropy constant is negative in value. Thus, a vertical magnetization film cannot be obtained from cobalt itself. Accordingly, attempts have been made to incorporate various impurities in cobalt, thereby rendering the saturation magnetization small. Several vertical magnetization films of Co alloys have now been proposed including, for example, Co—Cr alloy films obtained by sputtering and vacuum deposition techniques, Co—Ru alloy films by sputtering, and C0—Ni—Mn—P alloy films by the electroless plating technique. In these cobalt alloys, the C axis of the hexagonal closest structure of cobalt is arranged in vertical directions with respect to the film surface, by which the vertical anisotropic energy is ensured by the crystalline anisotropic energy. The saturation magnetization is reduced by the action of impurities contained in the alloys. As a result, the requirement of $K\perp > 2\pi Ms^2$ is satisfied. However, a magnetic film composed of, for example, 75 wt% of Co, 20 wt% of Ni, 3 wt% of P and 2 wt% of Mn is positive with respect to the magnetic anisotropy constant but its value is close to zero. Hence, this film does not exhibit magnetic characteristics suitable for use in vertical magnetic recording systems and are thus unsatisfactory.

SUMMARY OF THE INVENTION

It is an object of the present invention to provide magnetic recording media for high density recording and reproducing purposes which comprise a Co alloy layer for film.

It is another object of the invention to provide magnetic recording media whose magnetic anisotropy constant is large and which are suitable for use in vertical magnetization recording systems.

It is a further object of the invention to provide magnetic recording media whose vertical magnetization layer if formed stably and inexpensively at high formation speeds by a thin film formation technique such as plating.

The above objects can be achieved, according to the present invention, by a magnetic recording medium which comprises a substrate and a magnetic film of a Co—Ni—Zn—P alloy formed on at least one side of the substrate, the alloy substantially consisting of from 3 to 42 wt% of Co, from 54 to 89 wt% of Ni, from 4 to 8 wt% of P, and from 0.1 to 3.2 wt% of Zn provided that $(7.2\ X_p + 12.8)$ wt% $\leq X_{Ni} \leq (7.2\ X_p + 43.2)$ wt% in which $X_p$ represents a content of P and $X_{Ni}$ represents a content of Ni, both expressed by wt%. The magnetic recording medium exhibits such a large positive magnetic anisotropy constant that it is suitable for use in vertical magnetic recording systems.

The vertical magnetization films of the cobalt alloys contain Zn co-precipitated in amounts below about 3.2 wt%, so that the film composition is not only stabilized, but also the C axis of the hexagonal closest structure of alpha-cobalt in the precipitated film or layer tends to orient in the vertical direction with respect to the film face. This type of film has a reduced saturation magnetization and can achieve the requirement for the vertical magnetization film that $K\perp > 2\pi Ms^2$.

DETAILED DESCRIPTION AND PREFERRED EMBODIMENTS OF THE INVENTION

Figure 1:
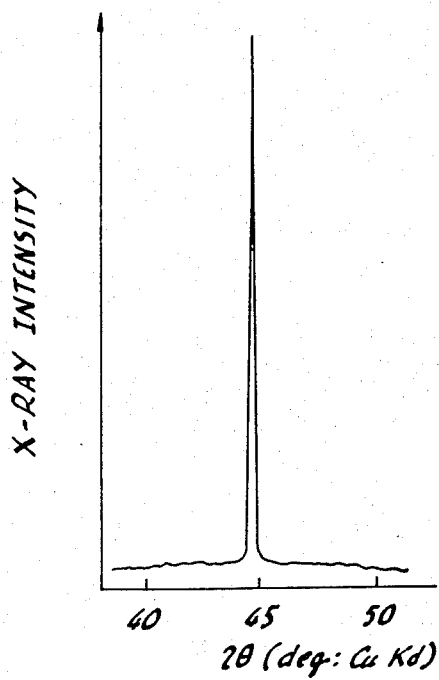
FIG. 1 is an X-ray diffraction pattern of a magnetic recording medium obtained in Example 1 of the present invention.
Figure 2:
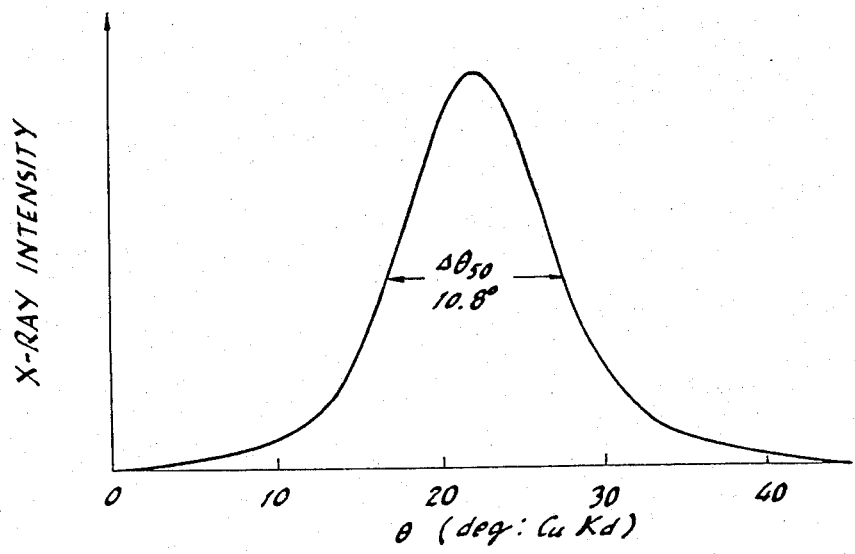
FIG. 2 is a locking curve of the (002) plane of the medium.

The magnetic recording medium according to the present invention comprises a substrate and a magnetic layer made of a quaternary alloy of a specific type formed on at least one side of the substrate. The substrates may take any forms of films, tapes, cards, sheets, discs and the like. Useful substrates are, for example, metal sheets on which a layer of, for example, a mixture of nickel and phosphorus is formed by plating. The metals suitable for the purposes include, for example, copper, aluminium and the like. The Ni—P layer may also be formed on sheets, films, tapes and the like articles of synthetic resins such as polyesters and the like by known techniques. Alternatively, polyimide sheets or films on which Fe—Ni alloys known as Permalloys are formed as a layer may also be used as the substrate. Still alternatively, metals themselves such as copper may be used as the substrate after treatment on the surface thereof.

In order to form a magnetic Co—Ni—Zn—P layer on the substrate, it is convenient and preferable to use an electroplating technique. For the formation of the layer by the electroplating technique, water-soluble metal salts such as chlorides, sulfates and the like are dissolved in water along with a phosphorus-yielding compound. That is, nickel, cobalt and zinc are used in the form of salts. Phosphorus is added to the solution in the form of, for example, hypophosphites. The solution containing the salts and a hypophosphite is usually rendered acidic in pH so as to facilitate the electroplating process. Amounts of the respective metal salts and the phosphorus compound in the plating solution depend on the composition of the magnetic layer. The electroplating is usually effected under conditions of a plating bath temperature of exceeding 30° C., preferably 40° to 95° C. and a current density of 0.3 to 5 $A/m^2$. As will be noted, the plating bath temperature is relative low as compared with the prior art case. The thickness of the magnetic layer is usually in the range of 0.1 to 5 microns, which may, more or less, vary depending on the purposes. The plating time depends largely on the current density and the intended thickness of the layer.

The vertical magnetization layer can be obtained, according to the invention, even when the Co content is as small as 3 wt% of the Co—Ni—Zn—P alloy composition. The vertical magnetization layer has a coercive force in the perpendicular direction, $Hc\bot$, ranging from 25 to 2320 oersteds. Proper control of the alloy composition can readily produce an $Hc\bot$ value ranging from 200 to 800 oersteds which is preferable as a vertical magnetization recording medium.

The present invention is particularly described by way of the following examples.

EXAMPLE 1

An about 0.2 mm thick rolled copper plate was cleansed and activated on the surfaces thereof by electrolytic washing or acid neutralization treatment, followed by forming on one surface thereof an about 0.2 micron thick non-magnetic 90 wt% nickel-10 wt% phosphorus layer, for example, by an elctroless plating.

The plated copper plate was provided as a substrate. The plate was subsequently immersed in an acidic plating solution having a pH of 4 and comprising 180 g/l of nickel chloride hexahydrate ($NiCl_2.6H_2O$), 60 g/l of cobalt chloride hexahydrate ($CoCl_2.6H_2O$), 6.8 g/l of zinc chloride ($ZnCl_2$), and 3.5 g/l of sodium hypophosphite monohydrate ($NaH_2PO_2.H_2O$) for 6 minutes at a bath temperature of 55° C. at a current density of 1 $A/m^2$, thereby forming an about 1.3 microns thick magnetic Co—Ni—P—Zn alloy layer. The pH was adjusted to 4, as mentioned above, by the use of hydrochloric acid and ammonia.

Figure 3:
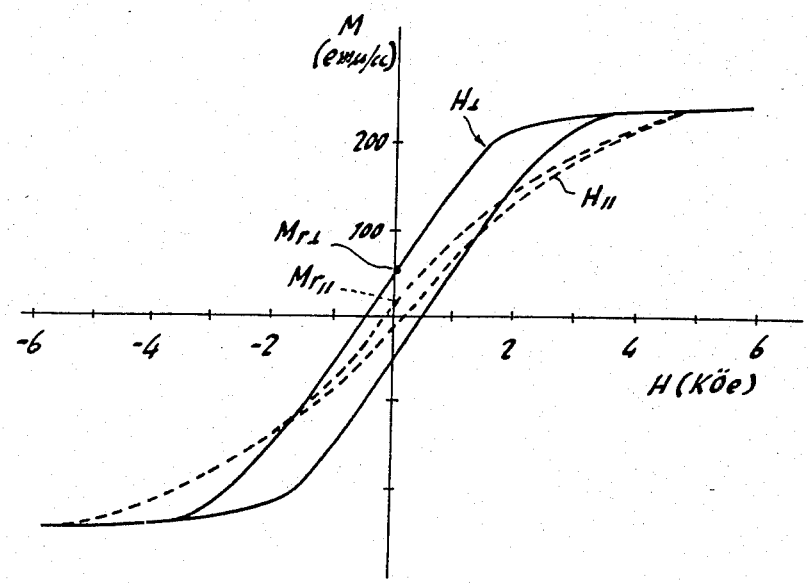
FIG. 3 is a hysteresis curve of the medium.
Figure 4:
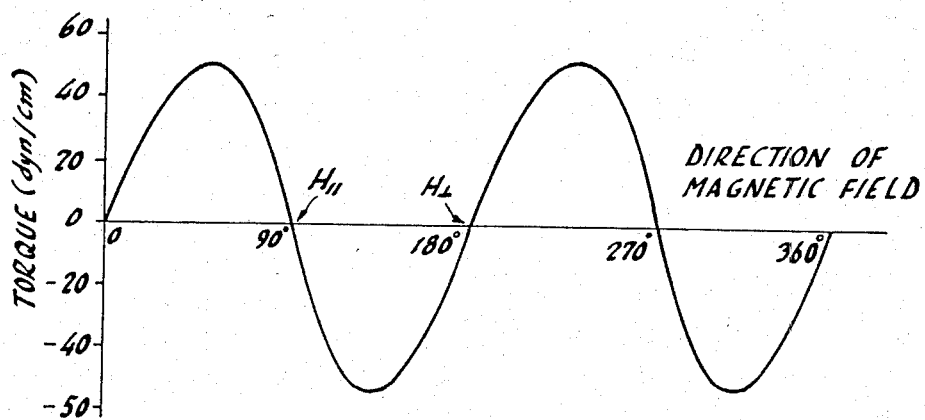
FIG. 4 is a torque curve of the medium.

The resulting magnetic layer had a composition of 82.8 wt% of Ni, 8.4 wt% of Co, 2.2 wt% of Zn, and 6.7 wt% of P. This magnetic recording medium was subjected to measurements of the X-ray diffraction pattern, locking curve of the (002) plane, and hysteresis and torque curves, with the results shown in FIGS. 1 through 4, respectively. According to the X-ray diffraction pattern of FIG. 1, the peak appears only in the (002) plane, from which it will be seen that the C axis of the hexagonal closest structure of the alpha-cobalt is oriented in the direction perpendicular to the layer face. Because the half-amplitude level $\Delta\theta_{50}$ of the locking curve is as small as 10.8°, the degree of dispersion of the C axis shows the fact that good orientation is ensured. From the hysteresis curve of FIG. 3 in which curves $H\bot$ and $H\|$ were obtained by applying a predetermined magnetic field to the medium perpendicular and parallel to the medium surface, respectively, it will be seen that these curves give evidence that the magnetic layer functions as a vertical magnetization layer or film. In other words, the ratio of a residual magnetization in the perpendicular direction, $Mr(\bot)$, to a residual magnetization in the horizontal direction, $Mr(\|)$, is greater than 1, i.e. $Mr(\bot)/Mr(\|) > 1$. Moreover, the torque curve also shows one of characteristics as a vertical magnetization film.

The magnetic layer obtained in this example had a saturation magnetization Ms of 254 emu/cc. The medium had a coercive force, $Hc\bot$, of 415 oersteds which was determined by applying a magnetic field in the vertical direction with respect to the film face and a coercive force, $Hc\|$, of 120 oersteds which was determined by applying a magnetic field in the parallel direction. The magnetic anisotropic constant Ku of the medium was found to be about $2.0\times 10^5$ erg/cc.

Thus, this medium was considered to be excellent as a recording medium for use in a vertical magnetization recording system. The magnetic layer has not so large a $Hc\bot$ value that only a reduced amount of current passed to magnetic heads is needed with only a reduced number of windings being required for the magnetic heads. This does not lead to poor high frequency responsibility of magnetic heads. On the other hand, the $Hc\bot$ value is not so small a value that there is produced no drawback of impairing recorded information by means of an external magnetic field other than those from magnetic heads.

The above procedure was repeated using, instead of the copper plate having the Ni—P layer thereon, the following four substrate:

(1) an aluminium plate on which a layer of 91 wt% nickel and 9 wt% phosphorus was plated in a thickness of about 20 microns and then mirror-finished;

(2) a 50 microns polyester sheet on which a 0.2 micron thick No—P layer was formed;

(3) a surface-finished copper plate; and (4) a 50 microns polyimide on which a permalloy (20 wt% Fe-80 wt% Ni) layer was formed in a thickness of 0.5 micron by sputtering.

The resultant recording media were found to be useful as vertical magnetization media.

EXAMPLES 2 THROUGH 29

The general procedure of Example 1 was repeated except that the plating bath composition, the pH of the bath, and the current density were changed, thereby forming a Co—Ni—Zn—P alloy film on each substrate. The resulting recording media were each subjected to the measurements of magnetic charcteristics from the X-ray diffraction pattern, and locking, hysteresis and torque curves. The results are shown in Table below.

| Ex. No. | Alloy Composition (wt %) | | | | Magnetic Characteristics | | | | | |
|---|---|---|---|---|---|---|---|---|---|---|
| | Ni | Co | Zn | P | Hc⊥ (Oe) | Hc// (Oe) | Ms (emu/cc) | Mr(⊥)/Mr(//) | $\Delta\theta_{50}$ (deg) | Ku erg/cc |
| 2 | 82.8 | 8.4 | 2.2 | 6.7 | 415 | 120 | 254 | 3.22 | 10.8 | $1.96 \times 10^5$ |
| 3 | 89.0 | 3.4 | 0.8 | 6.8 | 25 | 20 | 48 | 2.5 | 23.0 | $3.5 \times 10^4$ |
| 4 | 85.1 | 5.9 | 1.3 | 7.8 | 90 | 80 | 48 | 1.2 | 25.5 | $7.5 \times 10^3$ |
| 5 | 86.4 | 5.5 | 1.4 | 6.7 | 100 | 80 | 128 | 1.2 | 22.2 | $2.2 \times 10^4$ |
| 6 | 86.6 | 5.9 | 0.8 | 6.7 | 100 | 70 | 130 | 1.2 | 21.8 | $6.2 \times 10^4$ |
| 7 | 86.8 | 5.9 | 1.2 | 6.1 | 160 | 100 | 187 | 1.7 | 21.0 | $3.3 \times 10^4$ |
| 8 | 82.4 | 9.6 | 1.8 | 6.3 | 210 | 120 | 170 | 2.5 | 20.9 | $1.03 \times 10^5$ |
| 9 | 80.9 | 9.7 | 2.2 | 7.2 | 370 | 120 | 94.2 | 3.4 | 15.0 | $1.56 \times 10^5$ |
| 10 | 79.1 | 13.4 | 2.3 | 5.2 | 400 | 180 | 224 | 1.5 | 20.1 | $7.2 \times 10^4$ |
| 11 | 78.4 | 10.9 | 3.2 | 7.5 | 440 | 145 | 194 | 2.1 | 27.5 | $8.5 \times 10^4$ |
| 12 | 79.8 | 9.7 | 2.9 | 7.7 | 500 | 160 | 145 | 2.0 | 15.1 | $1.0 \times 10^5$ |
| 13 | 81.3 | 10.9 | 1.8 | 6.0 | 500 | 150 | 199 | 3.6 | 21.2 | $1.6 \times 10^5$ |
| 14 | 81.1 | 12.6 | 0.9 | 5.5 | 550 | 150 | 242 | 2.8 | 21.3 | $1.2 \times 10^5$ |
| 15 | 74.2 | 17.7 | 1.4 | 6.8 | 670 | 215 | 280 | 1.9 | 20.5 | $6.9 \times 10^4$ |
| 16 | 74.0 | 17.2 | 2.6 | 6.2 | 740 | 275 | 207 | 1.3 | 21.2 | $1.1 \times 10^5$ |
| 17 | 77.0 | 16.3 | 1.5 | 5.2 | 770 | 230 | 339 | 1.8 | 19.1 | $7.7 \times 10^4$ |
| 18 | 72.1 | 21.7 | 2.1 | 4.1 | 960 | 320 | 390 | 2.1 | 7.7 | $2.4 \times 10^5$ |
| 19 | 64.7 | 26.6 | 2.6 | 6.2 | 1400 | 400 | 325 | 2.9 | 10.2 | $9.6 \times 10^4$ |
| 20 | 63.8 | 29.5 | 2.0 | 4.8 | 1610 | 490 | 439 | 2.7 | 11.0 | $2.6 \times 10^5$ |
| 21 | 66.5 | 26.4 | 2.0 | 5.3 | 1650 | 390 | 442 | 3.5 | 10.1 | $3.4 \times 10^5$ |
| 22 | 67.8 | 24.2 | 1.8 | 6.1 | 1650 | 520 | 340 | 2.7 | 15.0 | $2.7 \times 10^5$ |
| 23 | 53.8 | 28.4 | 2.4 | 5.4 | 1740 | 830 | 451 | 1.8 | 10.8 | $1.5 \times 10^5$ |
| 24 | 67.4 | 24.3 | 2.3 | 6.1 | 1750 | 560 | 315 | 2.4 | 11.3 | $2.2 \times 10^5$ |
| 25 | 65.9 | 27.9 | 1.0 | 5.2 | 1790 | 560 | 485 | 2.4 | 9.2 | $1.8 \times 10^5$ |
| 26 | 68.2 | 24.7 | 1.5 | 5.5 | 1810 | 410 | 286 | 4.9 | 9.3 | $4.6 \times 10^5$ |
| 27 | 54.6 | 41.2 | 0.1 | 4.0 | 1900 | 1500 | 540 | 2.8 | 7.3 | $5.1 \times 10^5$ |
| 28 | 54.6 | 39.1 | 0.5 | 5.0 | 2200 | 1400 | 402 | 1.1 | 16.1 | $5.0 \times 10^4$ |
| 29 | 56.3 | 36.2 | 1.9 | 5.6 | 2320 | 1200 | 486 | 1.7 | 19.2 | $1.5 \times 10^5$ |

As will be clearly seen from the results of the above table, the alloy compositions which comprise from 3 to 42 wt% of Co, from 54 to 89 wt% of Ni, from 4 to 8 wt% of P, and from 0.1 to 3.2 wt% of Zn provided that (7.2 $X_p$+12.8) wt% $\leq X_{Ni} \leq$ (7.2 $X_p$+43.2) wt% in which $X_p$ represents a content of P and $X_{Ni}$ represents a content of Ni, yield magnetic layers of excellent characteristics as recording media for use in vertical magnetization recording systems. In view of the fact that the Hc⊥ value is optimumly in the range of from 200 to 800 oersteds, the alloy composition should preferably comprise from 5 to 22 wt% of Co, from 73 to 85 wt% of Ni, from 4 to 8 wt% of P, and from 0.1 to 3.2 wt% of Zn provided that $X_{Ni} <$ 7.2 $X_p$+43.2.

What is claimed is:

1. A magnetic recording medium for vertical magnetization recording which comprises a substrate and a magnetic film of a Co—Ni—Zn—P alloy formed on at least one side of the substrate, said alloy consisting essentially of from 3 to 42 wt% of Co, from 54 to 89 wt% of Ni, from 4 to 8 wt% of P, and from 0.1 to 3.2 wt% of Zn provided that (7.2 $X_p$+12.8) wt% $\leq X_{Ni} \leq$ (7.2 $X_p$+43.2) wt% in which $X_p$ represents a content of P and $X_{Ni}$ represents a content of Ni, both expressed by wt% whereby said magnetic film satisfies the following inequality: K⊥ > $2\pi Ms^2$ wherein K⊥ is an intrinsic vertical anisotropy constant, and $2\pi Ms^2$ is a saturation magnetization.

2. The medium according to claim 1, wherein said magnetic layer is formed on one side of said substrate.

3. The medium according to claim 1, wherein said magnetic layer is formed on each side of said substrate.

4. The medium according to claim 1, wherein said alloy consists essentially of from 5 to 22 wt% of Co, from 73 to 85 wt% of Ni, from 4 to 8 wt% of P, and from 0.1 to 3.2 wt% of Zn provided that $X_{Ni} <$ 7.2 $X_p$+43.2.

* * * * *